(12) United States Patent
Ahrenholtz et al.

(10) Patent No.: US 12,144,328 B2
(45) Date of Patent: Nov. 19, 2024

(54) PET LICK APPARATUS FOR LIQUID CONSUMABLES

(71) Applicant: Silver Fox L.L.C., Hopkins, MN (US)

(72) Inventors: Ted E. Ahrenholtz, Minnetonka, MN (US); Michele L. Pennington, Eden Prairie, MN (US); Stephanie M. Beetsch, Minneapolis, MN (US)

(73) Assignee: Silver Fox L.L.C., Hopkins, MN (US)

( * ) Notice: Subject to any disclaimer, the term of this patent is extended or adjusted under 35 U.S.C. 154(b) by 95 days.

(21) Appl. No.: 18/048,840

(22) Filed: Oct. 22, 2022

(65) Prior Publication Data
US 2023/0139227 A1 May 4, 2023

Related U.S. Application Data

(60) Provisional application No. 63/273,618, filed on Oct. 29, 2021.

(51) Int. Cl.
*A01K 7/00* (2006.01)
*A01K 5/01* (2006.01)

(52) U.S. Cl.
CPC ............ *A01K 7/005* (2013.01); *A01K 5/0114* (2013.01)

(58) Field of Classification Search
CPC ........ A01K 5/015; A01K 5/0114; A01K 7/00; A01K 7/005
See application file for complete search history.

(56) References Cited

U.S. PATENT DOCUMENTS

| 1,814,776 | A |   | 7/1931 | Waugh |
| 2,158,094 | A |   | 5/1939 | Teske |
| D180,346 | S | * | 5/1957 | Well ............................ D30/122 |
| D183,626 | S |   | 9/1958 | Morrison |
| 3,111,703 | A |   | 11/1963 | Kaufman |
| 3,336,065 | A |   | 8/1967 | Roberson |
| 3,359,678 | A |   | 12/1967 | Headrick |
| D209,763 | S |   | 1/1968 | Mueller |

(Continued)

FOREIGN PATENT DOCUMENTS

| CN | 116326497 A * | 6/2023 |
| DE | 208946 | 6/1908 |

(Continued)

OTHER PUBLICATIONS

Canadian Patent Office, Examination Search Report, counterpart Canadian Patent Application No. 318375 (May 8, 2024).

*Primary Examiner* — Ebony E Evans
(74) *Attorney, Agent, or Firm* — Schroeder & Siegfried, P.A.

(57) ABSTRACT

A low-profile disk-shaped base member which is designed for placement on a ground surface or floor, where the base member includes an elevated central hub portion with an opening extending therethrough. A lower cap element is releasably connectable in sealed relation to the hub from the bottom of the base member to form a cavity or chamber below the central opening in the base member. The chamber houses a rotatable ball or spherically shaped liquid delivery mechanism within its confines which extends upwardly through the central opening in the base member. The chamber is adapted to store a liquid consumable product, such as a liquid supplement or treat, for controlled delivery to the pet as the pet licks the ball.

20 Claims, 6 Drawing Sheets

(56) References Cited

U.S. PATENT DOCUMENTS

| | | | |
|---|---|---|---|
| 3,459,159 A | 8/1969 | Reed | |
| 3,508,360 A | 4/1970 | Williams | |
| D225,250 S | 11/1972 | Sun | |
| 3,724,122 A | 4/1973 | Gillespie, Sr. | |
| 3,734,060 A | 5/1973 | Collison | |
| 3,771,496 A | 11/1973 | Atchley | |
| D230,139 S | 1/1974 | Bart | |
| 3,946,703 A | 3/1976 | Wheat | |
| D241,917 S | 10/1976 | Borum | |
| 4,096,659 A | 6/1978 | Keane | |
| 4,117,626 A | 10/1978 | Kiffersein | |
| 4,132,029 A | 1/1979 | Thompson | |
| 4,212,131 A | 7/1980 | Ross, Jr. | |
| D260,786 S | 9/1981 | Chaklos | |
| D266,486 S | 10/1982 | Lutz | |
| 4,386,582 A | 6/1983 | Adsit | |
| 4,516,947 A | 5/1985 | Pircher | |
| 4,723,860 A | 2/1988 | Giblin et al. | |
| D312,103 S | 11/1990 | Lenox | |
| 5,109,798 A | 5/1992 | Impastato et al. | |
| 5,143,022 A * | 9/1992 | Fore | A01K 5/015 119/51.03 |
| D333,025 S | 2/1993 | Doherty | |
| 5,201,279 A * | 4/1993 | Impastato | A01K 5/015 119/51.03 |
| D336,119 S | 6/1993 | Bridge, Jr. | |
| D346,626 S | 5/1994 | St. Lawrence | |
| 5,329,876 A * | 7/1994 | Tracy | A01K 7/02 119/51.03 |
| D350,783 S | 9/1994 | Bacon | |
| D351,692 S | 10/1994 | Cossey | |
| 5,437,244 A | 8/1995 | Van Gilst | |
| 5,636,592 A | 6/1997 | Wechsler | |
| D403,584 S | 1/1999 | Bakic | |
| D436,866 S | 1/2001 | Freeman | |
| 6,578,517 B2 | 6/2003 | Borries | |
| 6,718,912 B2 | 4/2004 | Pappas | |
| 6,758,165 B2 | 7/2004 | Pappas et al. | |
| 7,089,881 B2 | 8/2006 | Plante | |
| 7,117,818 B2 * | 10/2006 | Pappas | A01K 1/0356 215/337 |
| 7,153,053 B1 | 12/2006 | Wiley | |
| 7,682,214 B2 | 3/2010 | Barniak, Jr. | |
| 7,832,362 B2 | 11/2010 | DeGhionno | |
| 7,976,355 B2 | 7/2011 | McAnulty | |
| D665,036 S | 8/2012 | Wechsler | |
| 8,371,244 B2 | 2/2013 | Krasner | |
| 8,448,604 B2 | 5/2013 | Pappas | |
| 8,464,660 B2 | 6/2013 | Valeriano | |
| D693,004 S | 11/2013 | Larsen | |
| 8,591,134 B2 | 11/2013 | Cahill | |
| 8,596,220 B2 | 12/2013 | Mainini | |
| D704,386 S | 5/2014 | Woller | |
| D735,421 S | 7/2015 | Plant | |
| 9,226,482 B2 | 1/2016 | Cardaropoli | |
| D755,449 S | 5/2016 | Cornwell, Jr. | |
| 10,464,719 B2 | 11/2019 | May | |
| D901,094 S | 11/2020 | White | |
| D953,655 S | 5/2022 | Tu | |
| D953,656 S | 5/2022 | Wang | |
| D963,254 S | 9/2022 | Jin | |
| D987,202 S * | 5/2023 | Ahrenholtz | D30/132 |
| 2004/0089245 A1 | 5/2004 | Markham | |
| 2004/0142073 A1 | 7/2004 | Buchanan | |
| 2005/0061258 A1 | 3/2005 | Block | |
| 2005/0092258 A1 | 5/2005 | Markham | |
| 2007/0289539 A1 | 12/2007 | Berry et al. | |
| 2009/0031962 A1 | 2/2009 | Webber | |
| 2010/0116213 A1 * | 5/2010 | Cahill | A01K 7/005 119/72.5 |
| 2011/0088628 A1 | 4/2011 | Valeriano | |
| 2014/0048017 A1 | 2/2014 | Mainini et al. | |
| 2024/0147958 A1 * | 5/2024 | Sumitsuji | A01K 5/0114 |

FOREIGN PATENT DOCUMENTS

| | | | |
|---|---|---|---|
| DE | 29921145 U1 | 5/2000 | |
| EP | 1074177 A2 * | 2/2001 | A01K 5/015 |
| EP | 1627571 | 6/2005 | |
| GB | 2215673 | 3/1988 | |
| GB | 2351000 A * | 12/2000 | A01K 7/00 |
| GB | 2532578 A * | 5/2016 | A01K 15/025 |

* cited by examiner

PET LICK APPARATUS FOR LIQUID CONSUMABLES

CROSS REFERENCE TO RELATED APPLICATIONS

This application is a nonprovisional patent application which claims the benefit of U.S. Provisional Application Ser. No. 63/273,618, filed on Oct. 29, 2021, entitled "Pet Lick Apparatus For Liquid Consumables," the contents of which is incorporated herein in its entirety by reference thereto.

FIELD OF INVENTION

The present invention relates generally to a device and method for delivering a liquid consumable to an animal, such as a dietary supplement, calming agent or liquid pet treat, and more particularly to a device capable of stimulating the play instinct of animals while simultaneously delivering a liquid consumable product thereto.

BACKGROUND

The statements in this section merely provide background information related to the present disclosure and may not constitute prior art.

It is known that animals instinctively lick objects in order to investigate their surroundings, to show affection and to be playful. Animals also lick objects and use their tongues as a means of consuming liquids, salt, and other food and nutritional substances. During play, pet animals, particularly dogs and cats, like to lick, chew and wrestle with their toys as a form of playful enjoyment.

Pets also require special care on a regular basis to maintain a proper nutritional diet. For this reason, pet owners oftentimes add dietary supplements to an animal's feed and/or liquid consumables. This has led the pet industry to develop various interactive toy products which are designed to stimulate the play instincts of the pet while simultaneously delivering additional supplements or treats thereto. Toys of this type are often totally edible or constructed with an inedible shell that can expel one or more edible nutrients upon compression. One such toy is disclosed in U.S. Patent Publication No. US20040142073A1.

Other animal lick devices have also been developed which are not designed to be eaten or chewed. One such device is disclosed in German Patent No. DE 29921145 U1, where a salt lick apparatus is designed to be rotatably mounted upon a wall to prevent removal and chewing. The heaviest portion of the salt lick automatically rotates downward for the dog to lick. However, there is little play stimulation provided from this product for the animal.

It is evident, therefore, that there is a need and desire in the industry for an apparatus which will stimulate the playful instinct of a pet while simultaneously functioning to deliver a liquid consumable product thereto. Preferably, such a device will be capable of delivering a liquid consumable product to a wide variety of pets, large and small, and be constructed in such manner as to be reusable and difficult for the pet to destroy through chewing. It is with these objectives in mind, and more, that we have developed our improved pet lick apparatus for liquid consumables, as will be described in more detail below.

SUMMARY

In furtherance of the foregoing objectives, the present invention is comprised generally of a relatively low-profile disk-shaped base member or saucer which is designed for placement on a ground surface or floor, where the base member includes an elevated central hub portion with an opening extending therethrough. A lower cap element is releasably connectable in sealed relation to the hub from the bottom of the base member to form a cavity or chamber below the central opening in the base member. The chamber houses a rotatable ball or spherically shaped liquid delivery mechanism within its confines which extends upwardly through the central opening in the base member. The chamber is adapted to store a liquid consumable product (such as a liquid supplement, calming agent, or treat) for controlled delivery to the pet as the pet licks the ball.

The ball is supported within the chamber of the lower cap such that any liquid within the chamber may flow unrestrictedly around a lower portion of the ball, thus always maintaining the ball in fluid contact with the liquid consumable. The diameter of the ball is greater than that of the central opening in the base member, so the ball will protrude through the opening when assembled to the lower cap. Accordingly, the ball becomes sandwiched between the lower cap and the base member and is permitted to roll within the chamber of stored liquid consumable as a pet animal licks the ball.

A circumferential seal seated between the wall of the chamber and the central hub prevents the liquid consumable stored in the chamber from escaping around the outside of the chamber wall. The opening of the base member is compliantly shaped to receive the ball, such that liquid from the chamber is permitted to escape through the opening in controlled amounts on and around the ball as the ball rolls within the chamber. Consequently, liquid from within the container may only pass through the central opening of the base member which carries the ball as the pet animal licks the ball.

The chamber and base member also include a cooperating adjustment feature which is adapted to permit adjustment of the upward pressure asserted against the ball by the lower cap, and consequently the tightness of the ball within the opening of the base member. This adjustment feature allows the user to adjust the force required to roll the ball within the chamber, thus facilitating use of the apparatus for pets of all sizes, large or small.

The foregoing and additional features and advantages of the present invention will be more readily apparent from the following detailed description. It should be understood, however, that the description and specific examples herein are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
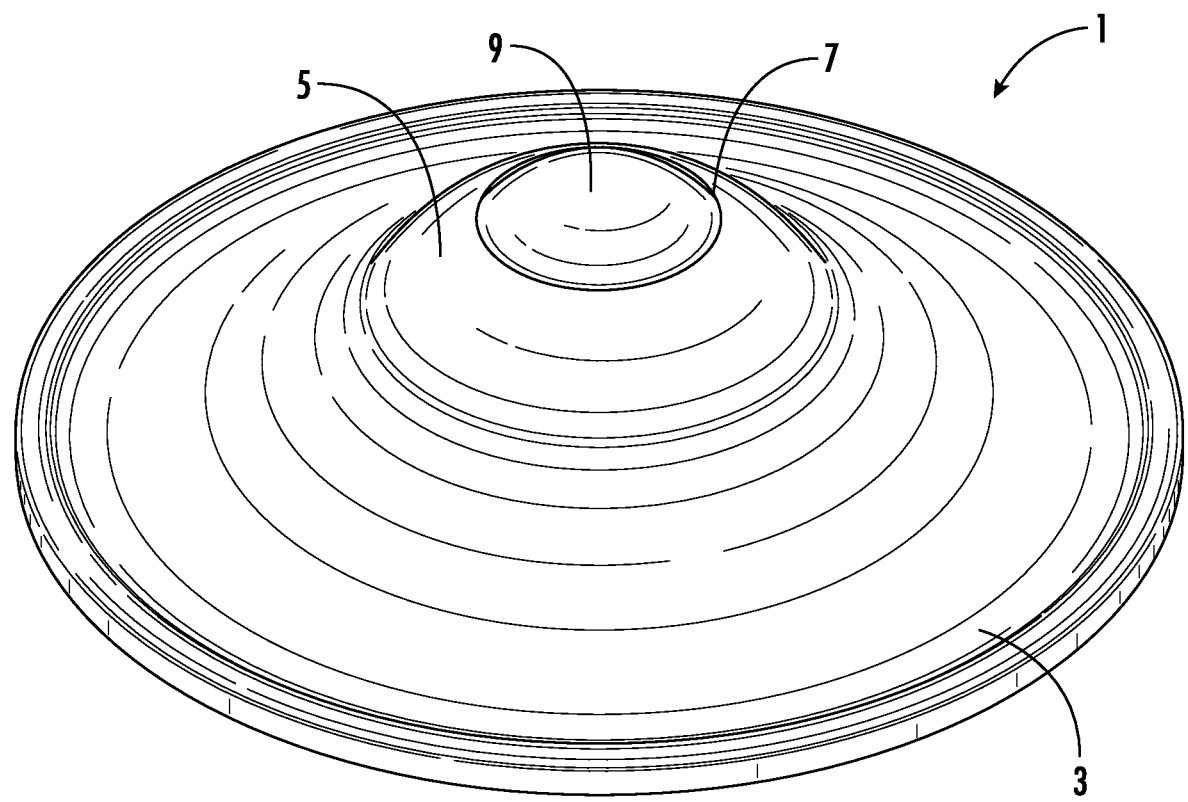
FIG. 1 is a top side perspective view of a pet lick apparatus for liquid consumables which incorporates the principles of our invention.

The following description is merely exemplary in nature and is not intended to limit the present disclosure, application, or uses. It should be understood that throughout the drawings, corresponding reference numerals indicate like or corresponding parts and features.

Figure 2:
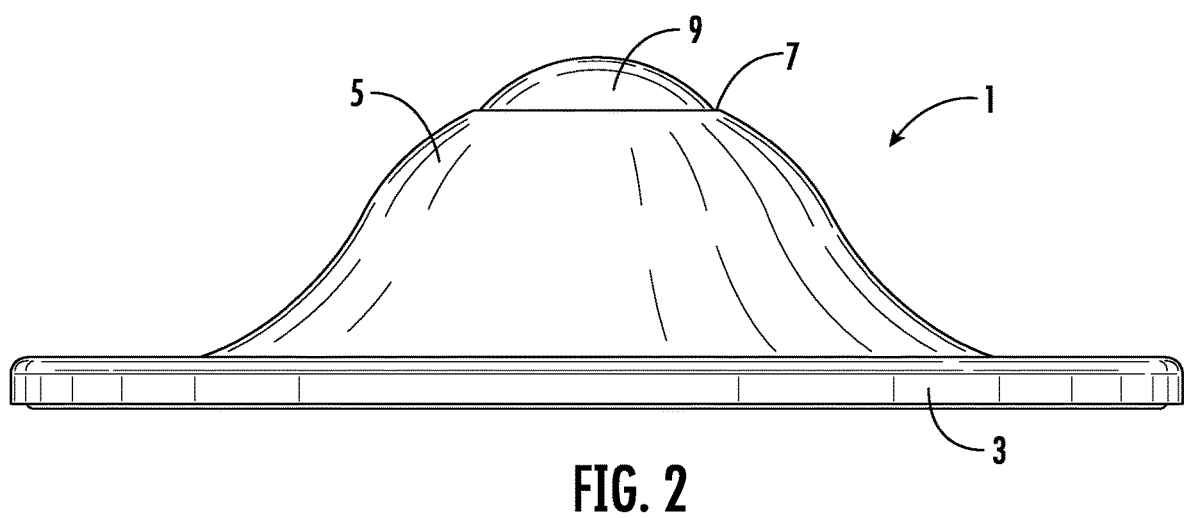
FIG. 2 is a side elevational view of the pet lick apparatus shown in FIG. 1.

With reference now to FIGS. 1 and 2 of the drawings, the pet lick apparatus 1 of the present invention is comprised generally of a relatively low-profile base member 3 which is designed for placement on a ground surface or floor. Base member 3 is preferably disk-shaped and formed with an elevated central hub portion 5 having an opening 7 extending therethrough. A protruding rotatable ball or spherically shaped liquid delivery mechanism 9 is supported within the central opening 7 of the base member 3 by a lower cap member 11 which is releasably connectable to the underside of the hub 5 of base 3 (see, FIGS. 3 and 6).

Figure 3:
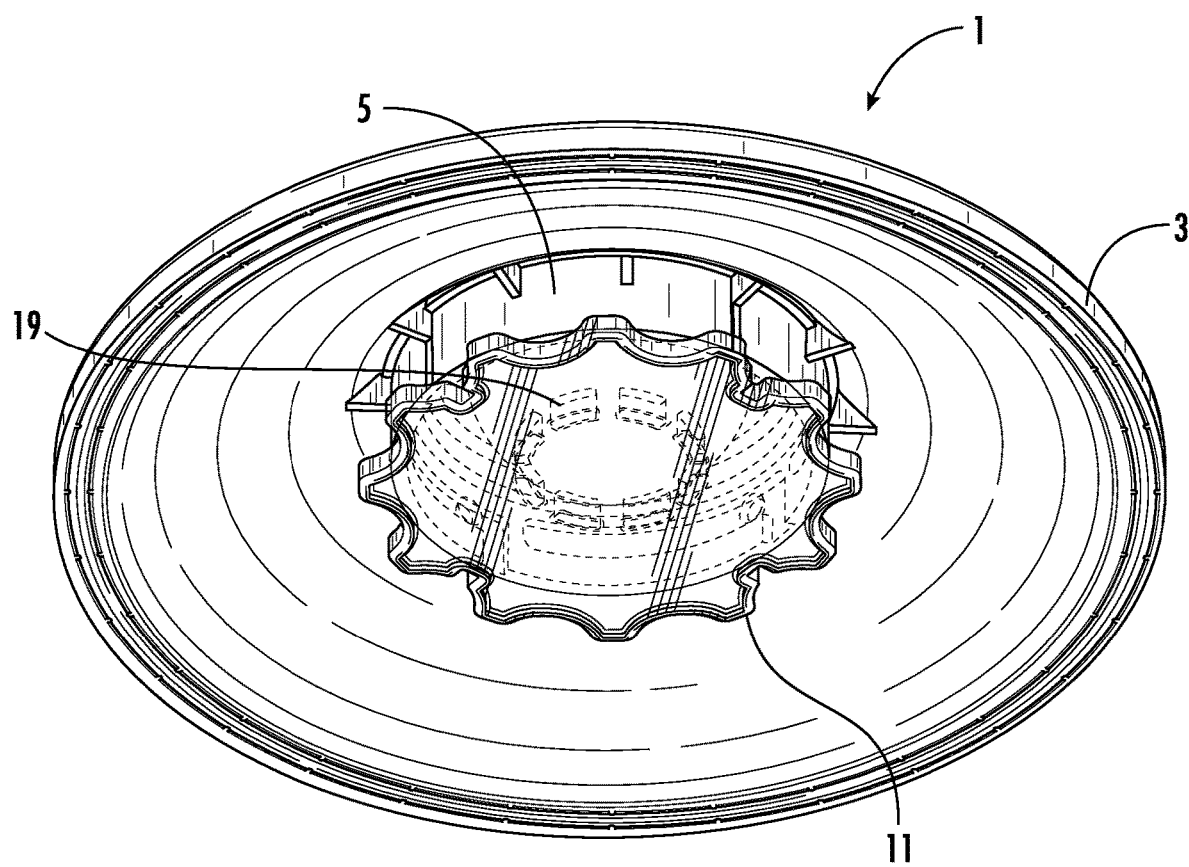
FIG. 3 is a bottom side perspective view of the pet lick apparatus shown in FIG. 1.
Figure 6:
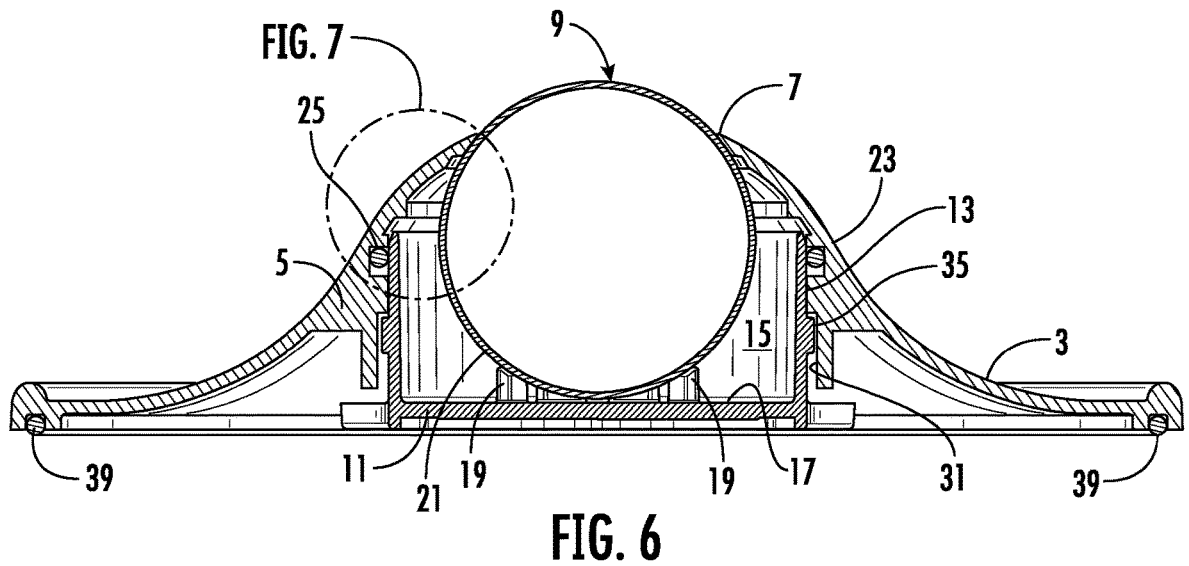
FIG. 6 is a vertical section view of the pet lick apparatus of FIG. 1, showing the assembly of the apparatus.

As best shown in FIGS. 3 and 6, the lower cap 11 is releasably connectable in sealed relation to the central hub 5 from the underside of base member 3. Lower cap 11 includes a peripheral sidewall 13 which forms a cavity or chamber 15 that is positioned below the central opening 7 in the base member 3. As will be describe in more detail hereafter, the chamber 15 of lower cap 11 houses and supports the ball 9 within its confines and, when assembled to base 3, pushes ball 9 upwardly through the central opening 7 thereof. The chamber 15 is adapted to store a liquid consumable product (not shown), such as a liquid supplement, calming agent, or treat, for controlled delivery to a pet as the pet licks and rotates the ball 9 within chamber 15.

Figure 4:
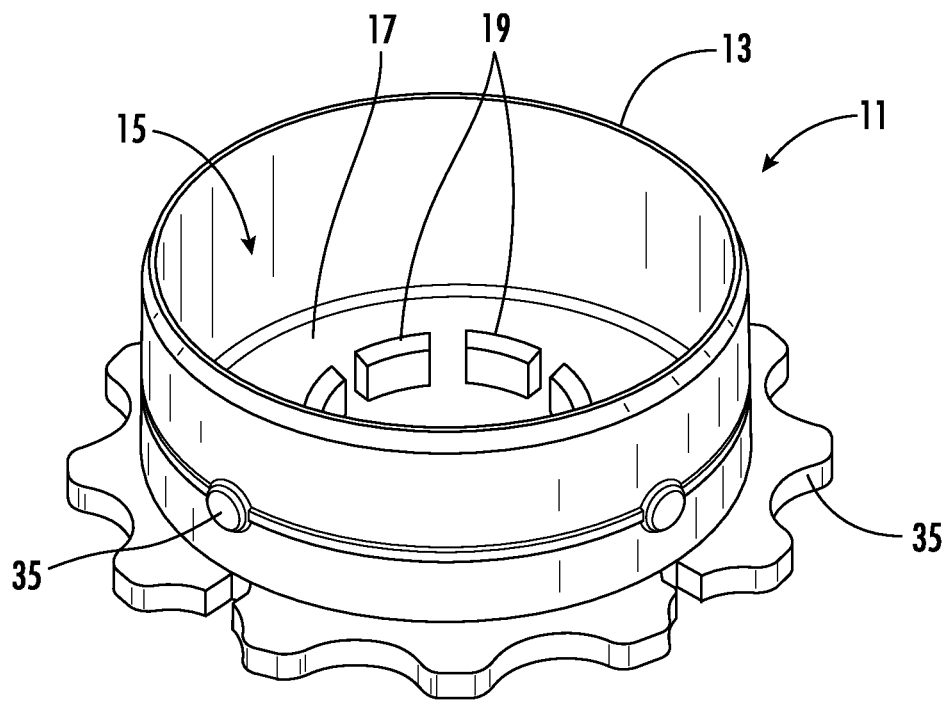
FIG. 4 is perspective view of the bottom end cap of the pet lick apparatus shown in FIG. 1.
Figure 5:
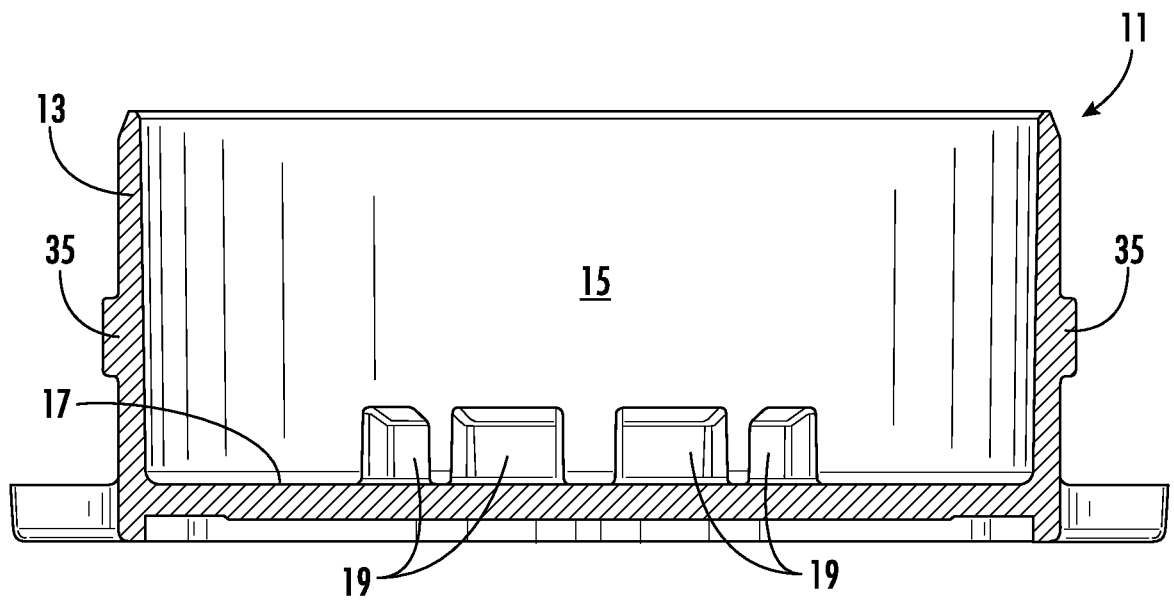
FIG. 5 is a vertical section view of the end cap shown in FIG. 4.

With reference to FIGS. 4 and 5, it is seen that the bottom inside surface 17 of the lower cap 11 includes a plurality of circumferentially spaced upwardly extending protrusions or support members 19 which are adapted to support the ball 9 within chamber 15 (see, FIG. 6). The circumferential spacing of the support members 19 permits liquid stored within the chamber 15 to easily flow unrestrictedly throughout the lower area of chamber 15 beneath and around the ball 9. As shown best in FIG. 6, the diameter of the ball 9 is greater than that of the central opening 7 in the base member 3, such that the ball 9 is capable of protruding upwardly through the opening 7 when assembled to the lower cap 11, yet is incapable of being withdrawn therethrough. Consequently, as the ball 9 is rolled through the licking action of a pet animal, the lower surface 21 of the ball 9 is maintained in continuous contact with the liquid consumable contained in the chamber 15. As a result of the surface tension between the liquid consumable and the ball 9, the liquid adheres to the wettable surface of the ball 9 as it is rolled and becomes exposed to the pet for consumption through the opening 7 in base 3.

Figure 7:
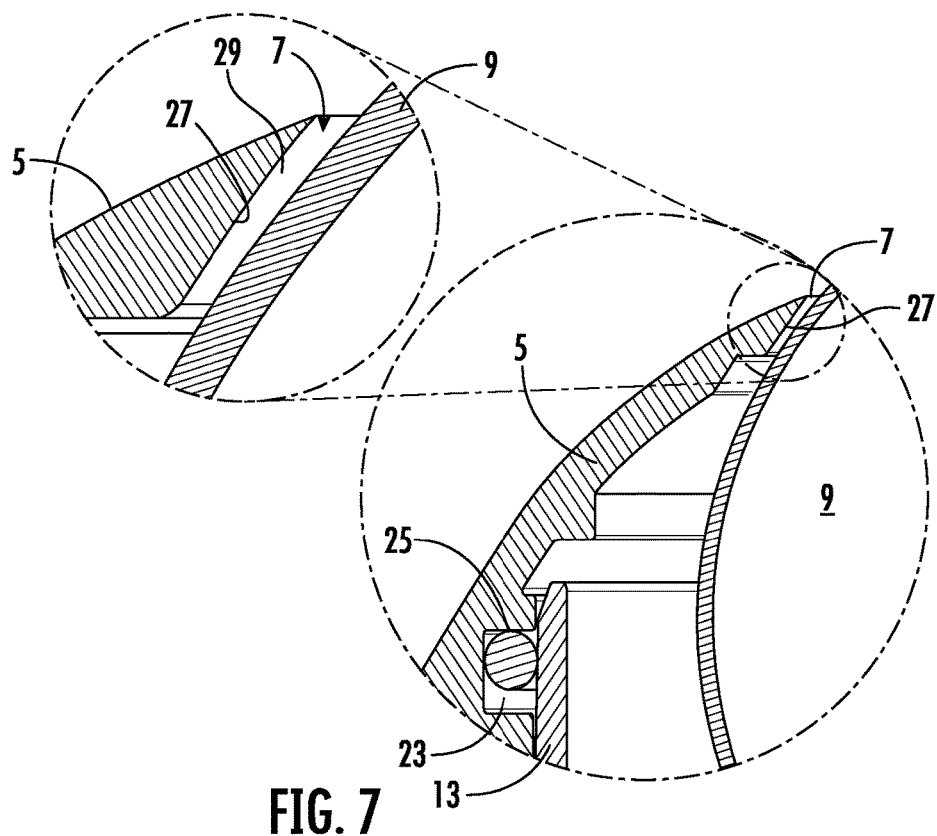
FIG. 7 is a close-up sectional view the joint between the base member, lower cap and liquid delivery ball, showing the chamber seal for the lower cap and showing a further blown-up sectional view of the minor adjustable clearance between the ball and base member.

As shown best in FIG. 6 and FIG. 7, the central hub 5 of base member 3 includes a circumferential channel or seat 23 adapted to receive an annular elastomeric chamber seal 25. This chamber seal 25 functions to seal the sidewall 13 of lower cap member 11 relative to the inner wall 31 of hub 5, such that liquid contained within the chamber 15 will not escape around the outside of the sidewall 13. As seen best in FIG. 7, the opening-defining portions 27 of base member 3 are tapered inwardly along the peripheral edge thereof to compliantly cooperate with the shape of the ball 9, such that an adjustable clearance or passageway 29 (described hereafter) for delivery of liquid consumables is formed between the ball 9 and base member 3.

As shown in the close-up views of FIG. 7, the minor spacing or adjustable passageway 29 is located between ball 9 and the opening-defining portions 27 in the hub 5 of base 3. As used herein and throughout the appended claims, reference to an "adjustable passageway" or "adjustable clearance" means that the spacing 29 between the ball 9 and base member 3 is adjustable. The size of passageway 29 may be varied as desired, i.e., constricted or expanded, to allow passage of liquid in controlled amounts through opening 7 on and around ball 9 as it rolls within chamber 15. Consequently, liquid consumables contained within the lower container or cap 11 may pass only through the central opening 7 of the base member 3 which carries the ball 9.

In a preferred embodiment described hereafter, the adjustability of passageway 29 is controlled by means of adjusting the tightness of the lower cap 11 to hub 5 of the base 3, and consequently the force of engagement or friction between ball 9 and base member 3 at opening 7. This, in turn, functions to vary the amount of liquid allowed to pass or be carried by ball 9 through passageway 29 through the mouth of opening 7 for delivery to a pet.

Figure 8:
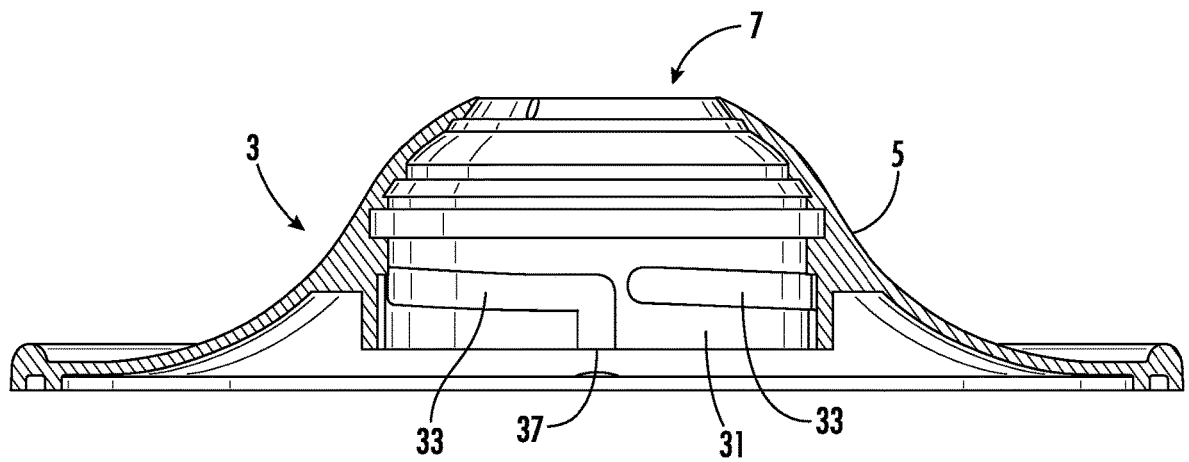
FIG. 8 is a vertical sectional view of the base member of the pet lick apparatus of FIG. 1, showing the channel adjustment feature formed in the central wall hub which facilitates adjustment of the lower end cap and tightening of the ball within the base opening.

Means for tightening cap 11 and controlling the amount of liquid consumables passing through opening 7 of the base member 3 is best illustrated in FIG. 8. As shown therein, the inner wall 31 of hub 5 is formed with a plurality of locking guide channels 33, each of which aligns with and is adapted to receive in locking relation a corresponding outwardly protruding locking tab 35 formed in the sidewall 13 of the lower cap member 11 (see, FIGS. 4 and 5). To secure the lower cap 11 to the hub 5 of base member 3, as seen in FIG. 6, the locking tabs 35 on the sidewall 13 of cap 11 are inserted upwardly into the locking guide channels 33 through openings 37 formed in the lower end of hub 5. Once fully inserted, cap 11 may be tightened by turning the cap, whereby the locking tabs 35 will advance within the guide channels 33.

As shown further in FIG. 8, the elongated portion of locking guide channels 33 extend generally horizontal, but slope or ramp slightly upward from horizontal. Therefore, upon rotating cap 11, the locking tabs 35 fixed thereto will gradually draw the entire cap 11 upwardly further into hub 5. In this manner, the space within chamber 15 which supports ball 9 is also constricted vertically, thereby causing ball 9 to move upward as well. In turn, the space 29 between the ball 9 and opening-defining portions 27 of base 3 also becomes more constricted, thus enabling the user to effect continuous and controlled adjustment of the amount of liquid consumable dispensed from the pet lick apparatus 1.

In order to ensure the pet lick apparatus 1 remains stationary on the floor or other surface as the pet licks and plays with the ball 9, the base member 3 is fitted with a circumferential pad or gripping member 39 which protrudes slightly downward from the bottom of base 3 for engagement with the surface upon which base 3 is set. In this regard, it is contemplated that the gripping member 39 may be formed of an elastomeric material, or other suitable material capable of maintaining a frictional bearing contact with the surface upon which base 3 is placed.

Thus, by adjusting the tightness of ball 9 within the opening 7 of base 3, the pet lick apparatus 1 may be effectively adjusted to accommodate pets of all sizes, from kittens to large dogs, etc. By simply adjusting cap 11, the licking force required for a pet to overcome the frictional force between ball 9 and base member 3, thus enabling ball 9 to rotate therewithin, may be adjusted as desired. In this manner, by accounting for the play or licking strength of the pet animal and adjusting the resistance of ball 9 within base member 3 accordingly, the user may effectively control the desired amount of liquid consumables that will be delivered to a pet.

As best shown in FIG. 3, to further facilitate use of the pet lick apparatus 1, it is contemplated that the lower cap 11 can be formed of a transparent material, such as a clear plastic material. This will enable the user of the device to monitor the volume of liquid consumables which are contained within chamber 15 and refill the same as necessary. Of course, it is also contemplated that cap 11 could be formed of an opaque material without departing from the invention herein.

As to the base member 3 and ball 9, it is also contemplated that such components be form of a fairly rigid material, such as a rigid plastic, metal or ceramic which is capable of withstanding the play action or attempted chewing of a pet. In this regard, as seen in FIG. 1, it is noted that the preferred embodiment disclosed herein is formed with a relatively low, smooth disk-like profile with soft edges to make it more difficult for a pet animal to grip the apparatus in its mouth to chew, and thus encourage the pet to instead use a playful licking action on the rotatable ball 9. Of course, it is certainly conceivable that other and additional configurations and profiles of the pet lick apparatus 1 could be used without departing from the invention herein.

Certain terminology is used herein for purposes of reference only, and thus is not intended to be limiting. For example, terms such as "upper", "lower", "above", "below", "top", "bottom", "upward", "downward", "rearward", and "forward" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The disclosure herein is intended to be merely exemplary in nature and, thus, variations that do not depart from the gist of the disclosure are intended to be within the scope of the disclosure. Such variations are not to be regarded as a departure from the spirit and scope of the disclosure which comprises the matter shown and described herein, and set forth in the appended claims.

We claim:

1. A pet lick apparatus for liquid consumables, comprising:
   (a) a base member having an upper surface and a lower surface with an opening extending therebetween;
   (b) a releasable cap connected to said lower surface of said base member, said cap forming a sealable chamber with said base member in fluid communication with said opening therein;
   (c) said chamber having a proximal end adjacent said opening, a peripheral sidewall, and an opposing distal end which together form an enclosure for containing a liquid consumable, said base member covering said chamber and extending at least to said distal end thereof;
   (d) a liquid delivery member being rotatably retained within said chamber by said base member and said cap, said liquid delivery member extending upward through said opening; and
   (e) said liquid delivery member having a wettable outer surface which is contactable with said liquid consumable contained within said chamber, such that rotation of said liquid delivery member causes said wettable surface to become exposed through said opening for consumption by the pet.

2. The pet lick apparatus set forth in claim 1, wherein said base member has a raised hub portion within which said opening is formed and to which said cap is rotationally connectable.

3. The pet lick apparatus set forth in claim 2, wherein said hub portion includes an inner wall surrounding said opening, said inner wall having a plurality of circumferentially extending guide channels formed therein which are adapted to receive in locking relation a set of corresponding mating locking tabs formed on said cap.

4. The pet lick apparatus set forth in claim 3, wherein said guide channels slope upwardly along said inner wall of said hub portion to facilitate adjustable rotational tightening of said cap and said liquid delivery member to said base member.

5. The pet lick apparatus set forth in claim 1, wherein said base member has a relatively low profile smoothly contoured saucer shape configuration which is substantially broader in width than in height and includes an outer peripheral gripping member for preventing slippage of said base member upon a surface of rest.

6. The pet lick apparatus set forth in claim 1, wherein said cap has a lower inside surface from which a plurality of spaced support members protrude upwardly, said support members being constructed to engage and suspend said liquid delivery member in an elevated position relative to said lower inside surface of said cap.

7. The pet lick apparatus set forth in claim 6, wherein said liquid delivery member is spherically shaped and said support members are spaced circumferentially in an annular configuration within said chamber formed by said cap.

8. The pet lick apparatus set forth in claim 1, wherein said base member has opening-defining portions for said opening which are shaped and proportioned to closely contour portions of said liquid delivery member and establish a minor adjustable clearance therebetween.

9. The pet lick apparatus set forth in claim 8, wherein said cap and said base member have a cooperative adjustable tightening engagement which enables adjustability of said clearance between said opening-defining portions of said base member and said liquid delivery member.

10. A pet lick apparatus for liquid consumables, comprising:
 (a) a base member having an upper surface, a lower surface, and a raised hub portion with an opening extending therethrough, said hub portion having an inner wall depending from said lower surface of said base member which surrounds said opening;
 (b) a releasable cap connected to said inner wall of said hub portion of said base member, said cap having an enclosing wall structure which mates with said inner wall of said hub portion to form a chamber in fluid communication with said opening;
 (c) a liquid delivery member being of larger compass than said opening in said base member and being retained within said chamber by engagement of said base member and said cap, said liquid delivery member being rotatable within said chamber and being constructed to extend partially upward through said opening; and
 (d) said liquid delivery member having a wettable outer surface which is contactable with a liquid consumable contained within said chamber, such that rotation of said liquid delivery member causes said wettable surface to become exposed through said opening for consumption by the pet.

11. The pet lick apparatus set forth in claim 10, wherein said opening is circular in shape and said liquid delivery member is comprised of a spherical ball.

12. The pet lick apparatus set forth in claim 10, wherein said inner wall has a plurality of circumferentially extending guide channels formed therein which are adapted to receive in locking relation a corresponding set of locking tabs formed on said mating wall structure of said cap.

13. The pet lick apparatus set forth in claim 12, wherein said guide channels slope upwardly along said inner wall of said hub portion to facilitate adjustable rotational tightening of said cap and said liquid delivery member to said base member.

14. The pet lick apparatus set forth in claim 10, wherein said cap has a lower inside surface from which a plurality of spaced support members protrude upwardly into said chamber, said support members being constructed to engage and suspend said liquid delivery member within said chamber in an elevated position relative to said lower inside surface of said cap.

15. The pet lick apparatus set forth in claim 10, wherein said base member has opening-defining portions for said opening which are shaped and proportioned to closely contour portions of said liquid delivery member and establish a minor adjustable clearance therebetween.

16. The pet lick apparatus set forth in claim 15, wherein said cap and said base member have a cooperative adjustable tightening engagement which enables adjustability of said clearance between said opening-defining portions of said base member and said liquid delivery member.

17. The pet lick apparatus set forth in claim 16, wherein said cap and said base member are sealably connected together in such manner as to allow said liquid consumable contained within said chamber to escape only through said clearance between said liquid delivery member and said opening-defining portions of said base.

18. A pet lick apparatus for liquid consumables, comprising:
 (a) a base member having an upper surface, a lower surface, and a raised central hub portion with a circular shaped opening extending therethrough, said hub portion having an inner wall depending from said lower surface of said base member which surrounds said opening;
 (b) a cap connected in sealed relation to said inner wall of said hub portion of said base member, said cap having an enclosing wall structure which mates with said inner wall of said hub portion to form a chamber in fluid communication with said opening;
 (c) a spherically shaped liquid delivery member having a diameter exceeding that of said circular opening in said base member and being retained within said chamber by connection of said cap to said base member, said liquid delivery member being rotatably mounted within said chamber and being constructed to extend partially upward through said opening;
 (d) said opening in said base being shaped and proportioned to closely contour portions of said liquid delivery member and establish a minor clearance therebetween, and said cap and said base member having a cooperative adjustable tightening engagement which enables adjustability of said clearance between said opening and said liquid delivery member; and
 (e) said liquid delivery member having a wettable outer surface which is contactable with a liquid consumable contained within said chamber, such that rotation of said liquid delivery member causes said wettable surface to become exposed through said opening for consumption by the pet.

19. The pet lick apparatus set forth in claim 18, wherein said inner wall has a plurality of circumferentially extending guide channels formed therein which are adapted to receive in locking relation a corresponding set of locking tabs formed on said mating wall structure of said cap.

20. The pet lick apparatus set forth in claim 19, wherein said guide channels slope upwardly along said inner wall of said hub portion to facilitate adjustable rotational tightening of said cap and said liquid delivery member to said base member.

\* \* \* \* \*